MAGNETOSTRICTIVE VIBRATORY APPARATUS

Original Filed Nov. 2, 1959 2 Sheets-Sheet 1

INVENTORS
CLAUS KLEESATTEL
LEWIS BALAMUTH
ARTHUR KURIS
BY
Reuben J. Carlson
ATTORNEY Aug. 13, 1963 C. KLEESATTEL ET AL 3,100,853

MAGNETOSTRICTIVE VIBRATORY APPARATUS

Original Filed Nov. 2, 1959 2 Sheets-Sheet 2

INVENTORS
CLAUS KLEESATTEL
LEWIS BALAMUTH
ARTHUR KURIS

BY Reuben J. Carlson
Attorney

United States Patent Office 3,100,853
Patented Aug. 13, 1963

3,100,853

MAGNETOSTRICTIVE VIBRATORY APPARATUS

Claus Kleesattel, Forest Hills, Lewis Balamuth, New York, and Arthur Kuris, Riverdale, N.Y., assignors to Cavitron Ultrasonics Inc., a corporation of New York Original application Nov. 2, 1959, Ser. No. 850,406, now Patent No. 3,056,698, dated Oct. 2, 1962. Divided and this application Aug. 15, 1961, Ser. No. 131,667
10 Claims. (Cl. 310—26)

This invention relates to vibratory apparatus, and more particularly to an improved accoustical vibrator assembly and an improved magnetostrictive vibrator unit designed to convert high frequency electrical energy into a mechanical vibratory power at high conversion efficiency. This application is a division of our copending application Serial No. 850,406 filed November 2, 1959, now U.S. Patent 3,056,698 patented October 2, 1962.

The apparatus of this invention embraces an improved acoustical vibrator assembly of high operating efficiency, and which includes a vibrator unit composed of a magnetostrictive transducer section bonded to a connecting body designed to operate as an acoustical impedance transformer. The magnetostrictive transducer section is composed of a compact stack of relatively thin magnetostrictive metal plates or laminates of generally arcuate shape and whose concavo-convex curvature is not substantially more than sixty degrees, and preferably in the range of approximately twenty-five degrees to forty-five degrees. By making the magnetostrictive laminates which compose the stack of identical shape and form and of limited concavo-convex curvative, the laminates can be compactly stacked with substantially no gap therebetween, and yet can be made relatively thin so that the applied magnetic flux penetrates the laminates to a substantial degree, and yet of sufficient stiffness so that the laminates will not bend when longitudinally vibrated at the operating frequency. The relatively thin arcuately shaped magnetostrictive laminates have the same physical length when compactly assembled in the stacked relation, and which length conforms to one-half wavelength or an integral multiple number of half wavelengths of sound traveling longitudinally through the magnetostrictive laminates at the operating frequency. The stacked laminates are also held in compactly stacked relation by a clamping device so formed and applied that the device does not impede the longitudinal vibration of the laminates which compose the stack.

One end of each of the compactly stacked laminates is rigidly bonded to one end of a connecting body designed to operate at an acoustical impedance transformer so that the output end thereof vibrates at a substantially greater amplitude than its input end where the vibrations are injected by the energized magnetostrictive transducer stack. The output end of the connecting body presents an end face which may be used to vibrate or cavitate liquids, or as is generally known in the art, may have a work tool fixed thereto for boring, cutting or chipping hard materials, with or without the use of abrasive slurries. The connecting body has a physical length corresponding to one-half wavelength or an integral multiple number of one-half wavelengths of sound traveling through the connecting body at the frequency of vibration injected into the input end thereof.

The magnetostrictive transducer stack and a section of the connecting body are designed to be removably inserted into a casing or housing which contains an energizing coil supported on a suitable spool contained within the casing, and through which the magnetostrictive transducer section is telescoped. The vibrator unit is supported by a collar fixed to one end of the casing and which is provided with clamping studs designed to releasably grip the connecting body at approximately a nodal area thereof. The energizing coil is supplied with biased alternating current which establishes and alternating magnetic field at and in adjacent relation to a nodal area of the magnetostrictive transducer section. The alternating magnetic field thus established has a frequency within the range of the resonance frequency of vibration for which the magnetostrictive transducer stack is designed. A cooling or blower fan is fixed to the opposite end of the casing or housing to supply a stream of cooling air in surrounding relation to the magnetostrictive transducer stack, and the side walls of the casing adjacent the opposite end thereof are provided with suitable port holes through which the warmed air is ejected.

Other objects and advantages of this invention will become apparent as the disclosure proceeds.

Although the characteristics features of this invention will be particularly pointed out in the claims, the invention itself, and the manner in which it may be made and used, may be better understood by referring to the following description taken in connection with the accompanying drawings forming a part hereof, in which:

Similar reference characters refer to similar parts throughout the several views of the drawings and the specification.

Figures 1, 3:
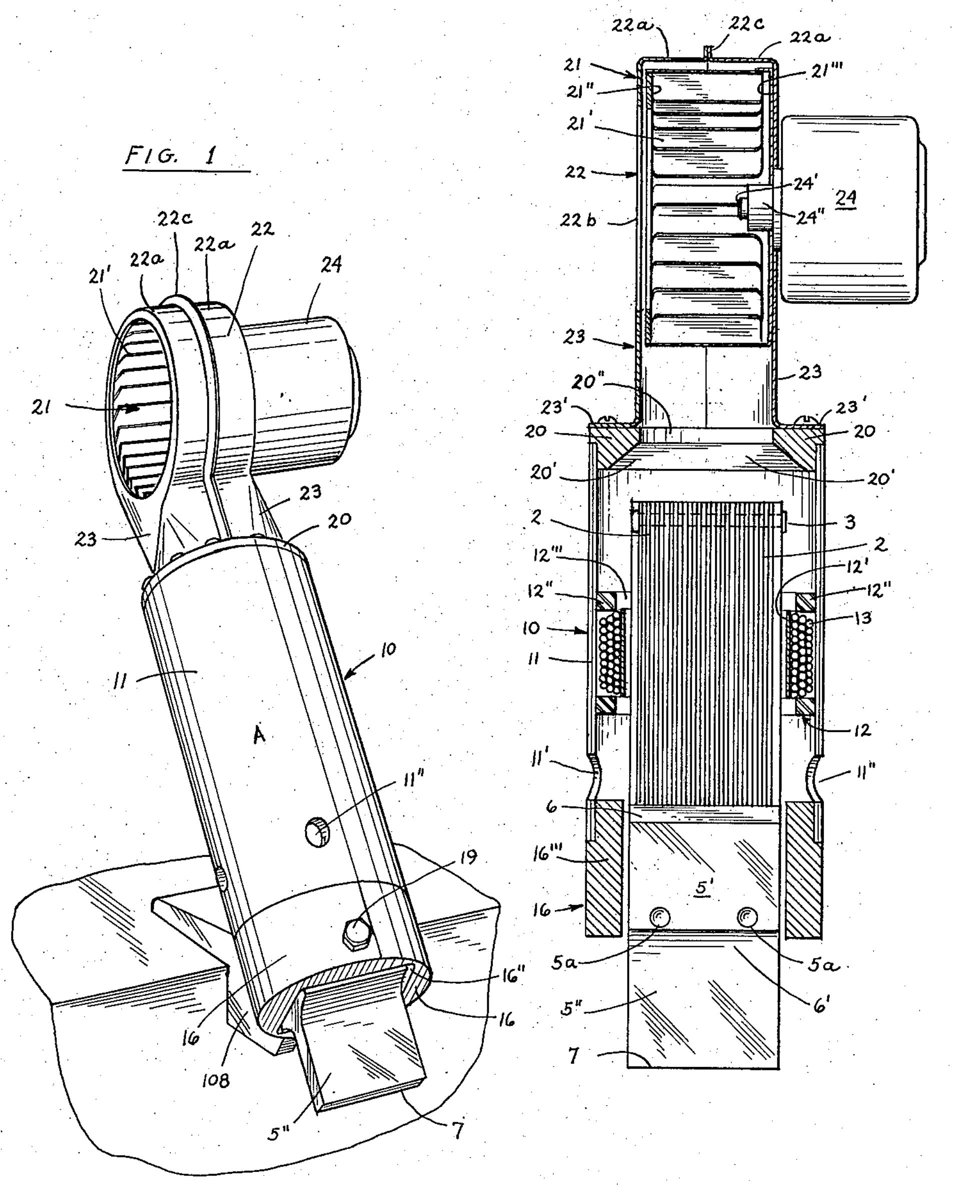
FIG. 1 is a pictorial illustration of one form of vibrator assembly constructed in accordance with this invention.
FIG. 3 is another longitudinal section of the vibrator assembly as the same would appear when viewed along line 3—3 of FIG. 3.
Figures 2, 4, 5, 6:
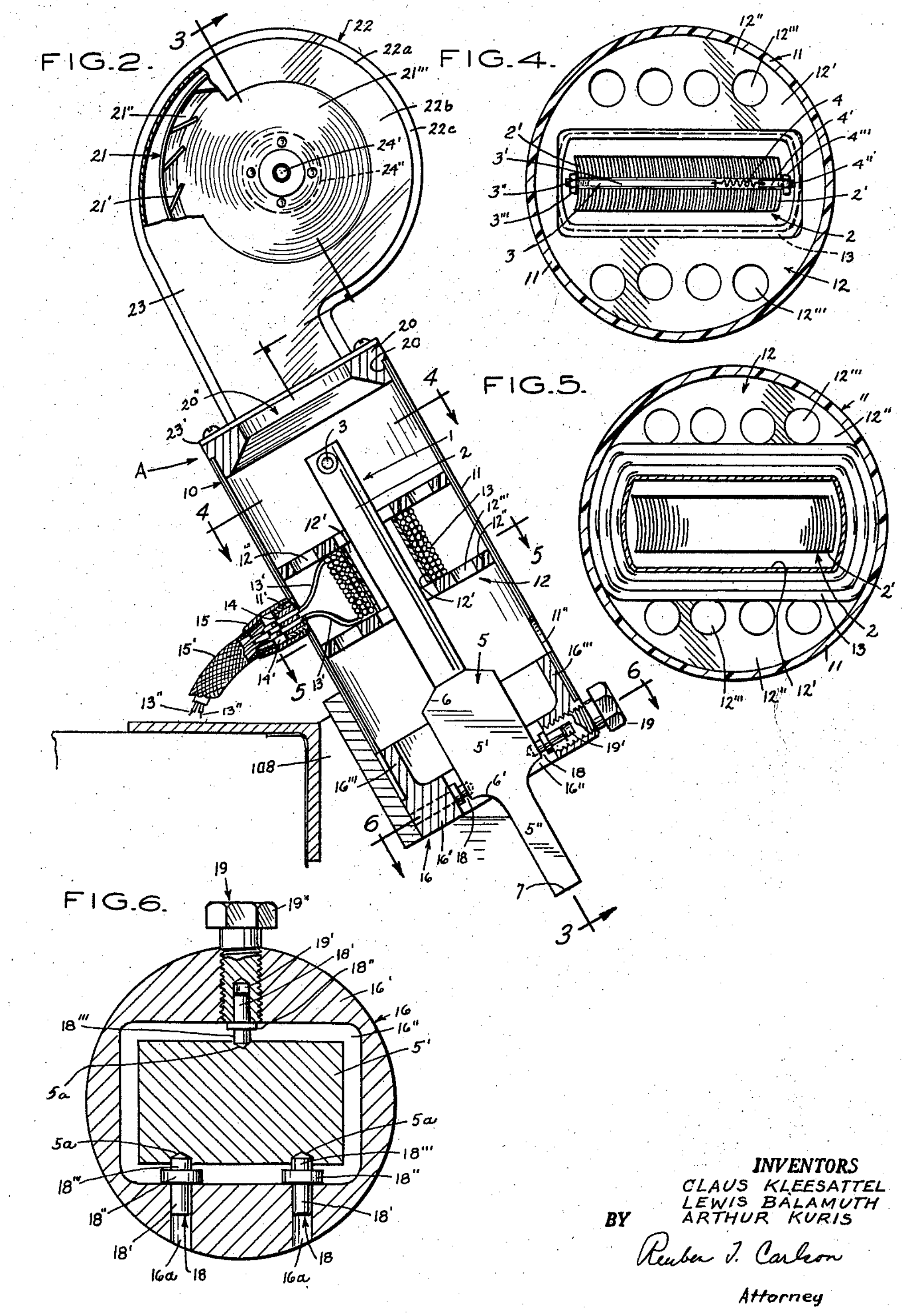
FIG. 2 is a longitudinal section of the improved vibrator assembly made in accordance with this invention, and corresponding to the vibrator assembly shown in FIG. 1.
FIG. 4 is a transverse section of the vibrator assembly as the same would appear when viewed in the direction of the arrows along line 4—4 of FIG. 2.
FIG. 5 is another transverse section of the vibrator assembly as the same would appear when viewed in the direction of the arrows along line 5—5 of FIG. 2.
FIG. 6 is a further transverse section of the vibrator assembly as the same would appear when viewed along line 6—6 of FIG. 2.

In general, the apparatus of this invention embraces a vibrator assembly A whose tubular housing 10 contains and supports a vibrator unit 1 whose tool or working face 7 projects beyond one end of the tubular housing 10 as shown in FIGS. 1, 2 and 3. The vibratory assembly A may be mounted in inclined or any other convenient position by means of a suitable bracket 108 which may be fixed to a supporting structure. The vibratory assembly A is so supported and mounted that the working end of its vibrator unit is operative to perform the desired work on the workpiece.

The vibrator assembly A, as shown more particularly in FIGS. 2 to 6 inclusive, essentially comprises a vibrator unit 1 which includes a transducer section 2 connected to the input end of an amplitude magnifying connecting body or acoustical impedance transformer 5 whose output end 7 provides the working or tool face of the vibrator assembly. The transducer section 2, operating at a frequency in the order of five to fifty thousand cycles per second, is composed of a stack of thin magnetostrictive metal plates or laminates 2′ as shown in FIGS. 2, 3, 4 and 5. Each metal plate 2′ is of uniform thickness and concavo-convex in cross-section and is formed from a metal such as perma-nickel, permendur, or other metal having high tensile strength and is highly magnetostrictive in character, so that the transducer section 2 will longitudinally vibrate to a maximum degree when subjected to the influence of an alternating magnetic field.

The stacked metal plates 2′ which compose the transducer section 2 may be maintained in compact internested relation as shown in FIGS. 4 and 5 by means of a resilient clamp 3 which includes a body pin 3' set within a conforming bore drilled through the plate stack, and which has a threaded end portion 3'' to which a clamp nut 3''' may be adjustably applied. The inner end of the body pin 3' is connected to one end of a tension spring 4 whose other end is connected to a plug pin 4' having a threaded end portion 4'' to which a clamp nut 4''' is applied. By a proper manipulation of the clamp nuts 3''' and 4''', the stacked plates 2' may be clamped together to provide a compact stack, but which nevertheless permits such differential longitudinal expansion of the compactly stacked plates as may result from variations in temperature to which the stacked plates are subjected when energized by an alternating magnetic field.

The output end of the transducer section 2 is rigidly connected to the input end of the connecting body 5. The connecting body 5 presents an enlarged body section 5' which may be generally rectangular in cross-section and preferably of larger cross-section than the transducer section 2. The enlarged body section 5' of the connecting body 5 is rigidly secured to the output end of the transducer section 2 as by silver solder, and presents its narrower side faces substantially in alignment with the narrower side faces of the transducer section 2, with its broader side faces merging into the broader faces of the transducer section 2 by tapered neck faces 6. The connecting body 5 also includes a reduced body section 5'' of smaller cross-sectional area than the enlarged body section 5', but may be generally rectangular in cross-sectional area, with the edge faces thereof substantially in alignment with the edge faces of the enlarged body section 5', and with the side faces thereof integrally joined to the side faces of the enlarged body section 5' by tapered neck faces 6'. The substantially flat and rectangular end face 7 of the reduced body section 5'' of the connecting body provides the working or tool attaching face of the vibrator unit. The connecting body 5 should be made of a strong metal such as, Monel metal, titanium, Phosphor bronze, beryllium copper or the like having high tensile strength and efficient vibration transmitting capabilities.

The transducer section 2 of the vibrator unit 1 should have a length corresponding to one-half wavelength of sound or integral multiples thereof traveling longitudinally through the material of the transducer section at the vibration frequency of the transducer section; and the connecting body 5 together with any tool attached thereto should have a combined length corresponding to one-half wavelength of sound or integral multiples thereof traveling longitudinally through the material of the connecting body and any tool attached thereto at the vibration frequency of the transducer section. The vibrator unit 1 should be designed to produce longitudinal motion strokes at the working face 7 thereof and whose amplitude may be in the order of one to three-thousandths of an inch. The length of the longitudinal motion strokes may be designed into the vibrator unit 1 in accordance with the metals from which it is formed, the acoustical characteristics of the metal, the frequency of vibration, and the length, shape and form of its components as explained in patent Re. 25.033.

The transducer section 2 and a major part of the connecting body 5 of the vibrator unit is contained in a tubular housing 10 which includes a tubular casing 11 formed of a non-magnetic and non-electrical conducting material such a nylon or like moldable plastic compound, as shown in FIGS. 2 and 3. The tubular casing 11 contains and supports a winding spool 12 formed of non-magnetic and non-electrical conducting material and which presents a tubular body 12' in surrounding relation to the transducer section 2 of the vibrator unit, and which is supported by circular side plates 12'' fixed to the tubular body 12' and whose circular peripheries are in bearing contact with the inside surface of the tubular casing 11.

An enamel coated current conducting wire 13 is wound in a multiplicity of layers on the tubular body 12' of the winding spool 12 as shown in FIGS. 2 and 5. The tubular body 12' of the winding spool 12 is preferably generally rectangular in cross-section to receive the rectangular intermediate portion of the transducer section 2 which extends therethrough, with the energizing winding 13 positioned in relatively close proximity to the intermediate portion of the transducer section 2. Biased alternating current of selected frequency is supplied to the winding 13 to thereby establish an alternating magnetic field in surrounding relation to the intermediate portion of the transducer section 2, to thereby cause the transducer section to longitudinally vibrate in accordance with the frequency of the biased alternating current and the acoustical characteristics of the metal from which the transducer section 2 is made.

The terminal lead wires 13' which extend from the winding 13 are provided with terminal socket connectors which may be molded into a supporting plug 14. The supporting plug 14 snugly seats within an externally threaded collar portion 11' which may be integrally formed as a part of the tubular casing 11. Insert prongs supported by a companion supporting plug 14' are designed to be plugged into the socket connectors. The prong supporting plug 14' may be snugly pocketed within an internally threaded coupling 15 which may be applied to the externally threaded collar portion 11' of the tubular casing 11. A flexible conduit 15' contains the current supply wires 13'' which are secured to the terminal prongs. The flexible conduit 15' and the current supply wires 13'' contained therein lead to a source of biased alternating current of selected frequency as hereafter described.

A vibrator unit supporting collar 16, attached to the head end of the tubular casing 11, provides substantially the sole support of the vibrator unit 1, as shown in FIGS. 2, 3 and 6. The vibrator unit supporting collar 16 may be formed from a relatively light metal such as aluminum, and has an internal body wall 16' presenting a conforming hole 16'' therein through which the enlarged body section 5' of the connecting body 5 extends. The supporting collar 16 may be provided with an inset flange portion 16''' over which the head end of the tubular casing 11 may be snugly telescoped and secured as by suitable screws.

The vibrator unit 1 is held in operative position by three studs 18, two of which are positioned along one of the broad sides of the vibrator unit connecting body 5. The third stud 18 is positioned adjacent the opposite broad side of the vibrator unit connecting body. Each of the three studs 18 presents a body portion 18', an enlarged head portion 18'', and a centering crown 18''' designed to seat snugly within a conforming pocket 5*a* formed in the adjacent broad side face of the enlarged body section 5' of the vibrator unit 1. As shown in FIG. 6, the body portions 18' of the two studs adjacent one broad side of the connecting body 5 are each fitted within a bored hole 16*a* formed in the body wall 16' of the supporting collar 16, with the head portions 18'' thereof seating against the inner side face of the body wall 16' of the supporting collar 16. The centering crowns 18''' of the two adjacent supporting studs 18 provide bearing support for the adjacent broad side of the enlarged body section 5' of the connecting body 5 of the vibratory unit.

The third supporting stud 18 on the opposite broad side of the connecting body 5 of the vibrator unit has a body portion 18' which extends into a socket hole 19' formed in the end of an externally threaded plug 19 which is threaded into a threaded bore extending radially through the body wall 16' of the supporting collar 16. The threaded plug 19 has an exposed head portion 19'' which may be externally manipulated. The enlarged head portion 18″ of third stud 18 whose body portion 18′ extends into the socket hole in the externally threaded plug 19, is designed to be engaged by the terminal end of the threaded plug 19 and manipulated so that the crown portion 18‴ thereof may be driven into the conforming hole 5*a* of the connecting body 5 by rotative manipulation of the threaded plug 19, without rotating the stud 18 associated therewith. The centering crowns 18‴ of the three supporting studs 18 are positioned to engage the connecting body 5 of the vibrator unit 1 in the approximate area of a node of vibration thereof. By manipulating the exposed head portion 19″ of the threaded plug 19, the centering crown 18‴ of its stud 18 may be withdrawn from the adjacent centering pocket 5*a* formed in the connecting body 5, and the entire vibrator unit 1 then withdrawn from the housing 10. In like manner, the threaded plug 19 may be manipulated so that the centering crown 18‴ of its stud 18 seats in the adjacent conforming pocket 5*a* formed on the adjacent side of the connecting body 5 to firmly secure the vibrator unit in mounted position between the centering crowns 18‴ of the three studs 18, with the reduced body section 5″ of the vibrator unit 1 extending beyond the body wall 16′ of the supporting collar 16. As known to the skilled in the art, the nodal area of longitudinal vibration of the connecting body 5 has a minor component of radial vibration whose amplitude is approximately one-fourth the amplitude of the longitudinal vibrations, in accordance with Poisson's ratio. These minor amplitude radial vibrations are not dampened by the studs 18 when their centering crows 18‴ are seated in conforming pockets 5*a* of the connecting body 5.

Since the transducer section 2 and exciting coil 13 generate heat during vibration, it is desirable to provide a coolant in surrounding relation to the transducer section 2 to maintain the transducer section 2, connecting body 5 and surrounding tubular housing 10 in relatively cool condition. This may be accomplished by driving a stream of cooling air through the tubular casing 11 as by means of a turbine type fan 21 contained in a fan casing 22 having an air stream directing throat section 23 connected to the tail end of the tubular casing 11. This connection may be made by the provision of an end collar 20, as shown in FIGS. 2 and 3, having an inset shoulder portion 20′ which telescopes into the tail end of the tubular casing 11 and is suitably secured thereto as by securing screws. The end closure collar 20 has a rectangular shaped air inlet hole 20″ therein which conforms to the rectangular area of the air inlet throat section 23 of the fan casing 22. The air inlet throat section 23 of the fan casing 22 may be provided with flared flanges 23′ secured to the interior end face of the end collar 20 as by suitable screws as shown in FIG. 3.

The fan casing 22 and its rectangular air inlet throat section 23 may be formed of two half sections each presenting a semi-circular body portion 22*a* joined to a side wall rim 22*b* which merges into the air inlet throat section 23, as shown in FIGS. 2 and 3. The half sections may be provided with outwardly flared flange portions 22*c* which may be detachably secured together as by spaced screws to thereby provide convenient access to the fan 21 contained in the half sections of the fan casing 22. The turbine type fan 21 presents a series of curvilinear blades 21′. One end of the curvilinear blades 21′ are secured to a connecting ring 21″ and the other end of the blades are secured to a circular connecting plate 21‴. The fan 21 is driven by a fractional horsepower constant speed motor 24 whose casing is secured to the adjacent side wall rim 22*b* of the fan casing 22. The motor shaft 24′ is secured to a hub portion 24″ which forms a part of the side wall plate 21‴ of the fan 21.

Since an air flow in the order of ten cubic feet per minute is sufficient to supply adequate cooling of the transducer section 2 and connecting body 5 of the vibrator unit 1 as well as the housing 10, a relatively small turbine type fan 21 driven by a small fractional horsepower motor 24 is sufficient to generate the required air stream. The generated air stream freely flows through the tubular body 12′ of the winding spool 12 and around the transducer section 2 and a portion of the connecting body 5 to thereby cool the same, and also flows through spaced air holes 12‴ formed in the circular side plates 12′ of the winding supporting spool 12 to thereby cool the coil winding 13. The warmed air escapes through a series of spaced holes 11″ formed in the circular wall of the tubular casing 11 adjacent the inset flange portion 16‴ of the vibrator unit supporting collar 16.

The relatively thin magnetostrictive metal plates or laminates 2′ which compose the transducer stack 2 are made substantially identical in width and length as shown in FIGS. 2, 3, 4 and 5, and each has the same arcuate or concavo-convex curvature which is not substantially more than sixty degrees, and preferably in the order of twenty degrees to forty-five degrees. The metal plates or laminates 2′ are also of substantially the same thickness, and as customary, are coated with an oxide of the metal of which they are composed to reduce eddy current losses. By limiting the concavo-convex curvature of the laminates as illustrated in FIGS. 4 and 5, the laminates can be compactly stacked with substantially no spacing or gap therebetween. The laminates 2′ may also be made relatively thin so that the magnetic flux, supplied by the surrounding alternating magnetic field generated by the energized winding 13, penetrates the thickness of the laminates to a major degree, and yet, due to their concavo-convex curvature, the laminates can be made sufficiently stiff and rigid when compactly nested together, so that no appreciable bending movement or bending waves occur along the length of the laminates when longitudinally vibrated at the operating frequency.

It will also be noted, by referrring to FIGS. 2, 3 and 4, that the laminates at the free end of the transducer stack are not joined by the customary solder cap or soldered key connection, so that the laminates can independently vibrate without impediment, and which feature further reduces flexural strains on the laminates. Each of the stack laminates, however, is rigidly bonded as by silver solder to the adjacent end of the connecting body 5. As shown in FIGS. 2 and 3, the adjacent end of the connecting body 5 should have a soldering area which is not less than the cross-sectional area of the compactly stacked laminates so that a rigid bond therebetween is assured.

It will also be noted by referring to FIGS. 2, 3 and 5, that the winding 13 presents a plurality of layers of compactly wound and insulated winding wire to provide a winding coil which is relatively short in length and is centered at a nodal area of the transducer stack 2, so that the alternating magnetic field produced thereby is concentrated at the nodal area, with resultant minimum power loss and maximum use of input power in the production of useful mechanical vibrations. By the use of cooling air to cool the transducer section 2, the heat generated by the transducer section during vibration is constantly removed and is kept relatively cool, thereby preserving its magnetostrictive qualities and insuring a long useful life thereof. The vibrator unit comprising the transducer section 2 and connecting body 5 can also be readily removed and replaced. The working face 7 of the vibrator assembly above disclosed can be used for the cavitation of liquids and the cavitational cleaning of porous objects, and by securing a suitable work tool to the working end of the connecting body 5, various boring, cutting, chipping and drilling operations can be performed with or without the use of abrasive slurries, as is well known in the art.

The entire vibrator assembly A, including its housing 10, vibrator unit 1, the fan casing 22 and the fan 21 contained therein, and its driving motor 24 mounted thereon, may be assembled as a completely integrated unit. The vibrator assembly A can be adjustably mounted as by means of a mounting bracket 108 attached to its supporting collar 16, and which can be rigidly or adjustably attached to a convenient support. The bracket 108 provides a rigid but adjustable support for the vibrator assembly so that its working or tool face 7 may be precisely positioned at the desired location with respect to the workpiece to be operated upon or the fluid medium to be vibrated.

While the vibrator assembly A may be designed to longitudinally vibrate the tool or working face 7 of its vibrator unit at any desired frequency in the order of from five to fifty kc. per second, it has been found that vibrations in the ultrasonic frequency range of fifteen to thirty kc. are preferred for most work operations. In this connection, it will be appreciated that the vibrator unit is constructed, proportioned and designed to vibrate at resonance at the preferred frequency of operation, and that the generating system is so designed and tuned as to operate at the optimum resonance frequency of the vibrator unit 1. In a frequency range of fifteen to thirty kc., the vibrator assembly A may be designed to longitudinally vibrate the working or tool face 7 at an amplitude in the order of approximately one-half thousandths to approximately three-thousandths of an inch. It will be appreciated that the tool or working face 7 of the vibrator unit 1 of the vibrator assembly A has a shape and area best suited to the work to be performed.

The power input required to vibrate the vibrator unit 1 of the vibrator assembly A is dependent upon the total mass of the vibrator unit 1, the area of its tool or working face 7, the frequency at which it is to be vibrated and other factors. Under these conditions, the wattage input may vary from a low of approximately 100 watts to as high as 5,000 watts or higher.

By making the working face 7 of the vibrator assembly A of appropriate shape, the apparatus of this invention can be advantageously and effectively employed for the cavitational cleaning of a wide range of intricate objects and articles, such as porous filters, bearing assemblies, clock and watch works, instrument assemblies and like devices whose intricate working elements present minute pores, cavities, passages or interstices containing impacted debris or other foreign material which must be thoroughly removed. As is generally known in the art, the working face 7 may constitute a work tool, or a work tool having a working end may be rigidly attached thereto, with the working face or work tool appropriately shaped for use in boring, cutting, chipping, forming or shaping numerous hard materials, with or without the use of abrasive slurries.

While certain novel features of this invention have been disclosed herein and are pointed out in the claims, it will be understood that various omissions, substitutions, and changes may be made by those skilled in the art, without departing from the teachings of this invention.

What is claimed is:

1. A vibrator unit having a magnetostrictive transducer section designed to be longitudinally vibrated when energized by a surrounding high frequency alternating magnetic field, said transducer section being composed of a multiplicity of similar magnetostrictive laminates of uniform width, length and thickness and which are compactly stacked in internesting relationship; each of said similar laminates having a concavo-convex cross-section whose curvature is not more than sixty degrees and whereby compact internesting of adjacent stacked laminates can be achieved with substantially no gap between the adjacent surfaces of the stacked laminates; the dimensional thickness of each laminate being sufficiently thin to insure penetration of the magnetic flux, as generated by the surrounding high frequency alternating magnetic field, through a major part of the thickness of the laminate; said stacked concavo-convex laminates having a length which corresponds to one-half wavelength of sound or an integral multiple number thereof traveling longitudinally through the stacked laminates at the frequency of vibration induced by the surrounding alternating magnetic field; and a connecting body composed of vibration transmitting material having one end face thereof rigidly bonded to one of the respective adjacent ends of each of said stacked concavo-convex laminates.

2. A vibrator unit having a magnetostrictive transducer section designed to be longitudinally vibrated when energized by a surrounding high frequency alternating magnetic field, said transducer section being composed of a multiplicity of similar magnetostrictive laminates of uniform width, length and thickness and which are compactly stacked in internesting relationship; each of said similar laminates having a concavo-convex cross-section whose curvature is not substantially more than sixty degrees and whereby compact internesting of adjacent stacked laminates can be achieved with substantially no gap between the adjacent surfaces of the stack laminates; the dimensional thickness of each laminate being sufficiently thin to insure penetration of the magnetic flux, as generated by the surrounding high frequency alternating magnetic field, through a major part of the thickness of the laminate; said stacked concavo-convex laminates having a length which corresponds to one-half wavelength of sound or an integral multiple number thereof traveling longitudinally through the stacked laminates at the frequency of vibration induced by the surrounding alternating field; a connecting body composed of vibration transmitting material having one end thereof rigidly bonded to one of the respective adjacent ends of each of said stacked concavo-convex laminates, the opposite ends of said stacked laminates being independent of each other and unrestricted in their individualized longitudinal vibrations; and means intermediate the ends of said stacked laminates for maintaining the laminates in compactly stacked relation without material dampening of the longitudinal vibrations set up therein.

3. A vibrator unit having a magnetostrictive transducer section designed to be longitudinally vibrated when energized by a surrounding high frequency alternating magnetic field, said transducer section being composed of a multiplicity of similar magnetostrictive laminates of uniform width, length and thickness and which are compactly stacked in internesting relationship; each of said similar laminates having a concavo-convex cross-section whose curvature is not substantially more than sixty degrees and whereby compact internesting of adjacent stack laminates can be achieved with substantially no gap between the adjacent surfaces of the stack laminates; the dimensional thickness of each laminate being sufficiently thin to insure penetration of the magnetic flux, as generated by the surrounding high frequency alternating magnetic field, through a major part of the thickness of the laminate; said stacked concavo-convex laminates having a length which corresponds to one-half wavelength of sound or an integral multiple number thereof traveling longitudinally through the stacked laminates at the frequency of vibration induced by the surrounding alternating magnetic field; a connecting body composed of vibration transmitting material having one end face thereof rigidly bonded to one of the respective adjacent ends of each of said stacked concavo-convex laminates, the opposite ends of said stacked laminates being independent of each other and unrestricted in their individualized longitudinal vibrations; and means for maintaining the laminates in compactly stacked relation without material dampening of the longitudinal vibrations set up therein which includes, a hole extending transversely through said stacked laminates adjacent the free ends thereof, and clamping means extending loosely through said hole and in seating engagement with the outer surfaces of the opposite outermost laminates.

4. A vibrator assembly including in combination; a vibrator unit having a transducer section composed of a multiplicity of similar and relatively thin magnetostrictive laminates of uniform width, length, thickness and concavo-convex curvature and which are compactly stacked in internesting relationship and operative to longitudinally vibrate at high frequency and small amplitude when energized by a high frequency alternating magnetic field, and a vibration transmitting acoustical impedance transformer whose input end is rigidly bonded to one end of the respective adjacent ends of said compactly stacked laminates and whose output end is provided with means for performing work; a housing having a collar section and a tubular body section extending from said collar section, said collar section being positioned to surround a sectional length of said acoustical impedance transformer and having an axial hole therein through which the output portion of the acoustical impedance transformer is designed to externally project and through which the transducer section and the input portion of said transformer may be inserted into and withdrawn from the body section of the housing, and adjustable means associated with said collar section and adapted to releasably engage said transformer at approximately a node of longitudinal vibration thereof to thereby removably support said vibrator unit in operative position; an energizing winding extending around but confined to the intermediate portion of said transducer section and operative when energized by high frequency alternating current to establish a concentrated and high frequency alternating magnetic field around the intermediate portion of said transducer section, and means for supporting said winding within the tubular body section of said housing but independently of said vibrator unit.

5. A vibrator assembly including in combination; a vibrator unit having a transducer section composed of a multiplicity of similar and relatively thin magnetostrictive laminates of uniform width, length, thickness and concavo-convex curvature and which are compactly stacked in internesting relationship and operative to longitudinally vibrate at high frequency and small amplitude when energized by a high frequency alternating magnetic field, and a vibration transmitting acoustical impedance transformer whose input end is rigidly bonded to one end of the respective adjacent ends of said compactly stacked laminates and whose output end is provided with means for performing work; a housing having an axial hole at one end thereof through which the output portion of the acoustical impedance transformer is designed to externally project and through which the transducer section and the input portion of said transformer may be inserted into and withdrawn from said housing, and adjustable means associated with said housing and adapted to releasably engage said transformer at approximately a node of longitudinal vibration thereof and thereby removably support said vibrator unit in operative position; an energizing winding extending around but confined to the intermediate portion of said transducer section and operative when energized by high frequency alternating current to establish a concentrated and high frequency alternating magnetic field around the intermediate portion of said transducer section, and means for supporting said winding within said housing and independently of said vibrator unit; and means for propelling a gaseous coolant into said housing and in surrounding relation to said transducer section.

6. A vibrator assembly including in combination; a vibrator unit having a transducer section composed of a multiplicity of similar and relatively thin magnetostrictive laminates of uniform width, length and thickness which are compactly stacked in internesting relationship and operative to longitudinally vibrate at high frequency and small amplitude when energized by a high frequency alternating magnetic field, and a vibration transmitting acoustical impedance transformer whose input end is rigidly bonded to one end of the respective adjacent ends of said compactly stacked laminates and whose output end is provided with means for performing work; a housing having a collar section and a tubular body section extending from said collar section, said collar section being positioned to surround a sectional length of said acoustical impedance transformer and having an axial hole therein through which the output portion of the acoustical impedance transformer is designed to externally project and through which the transducer section and the input portion of said transformer may be inserted into and withdrawn from said housing, and adjustable means associated with said collar section and adapted to releasably engage said transformer at approximately a node of vibration thereof and thereby removably support said vibrator unit in operative position; an energizing winding extending around and confined to the intermediate portion of said transducer section and operative when energized by high frequency alternating current to establish a concentrated and high frequency alternating magnetic field around the intermediate portion of said transducer section, and means for supporting said winding within said housing and independently of said vibrator unit; and a blower fan connected to the opposite end of said housing for propelling a gaseous coolant into said housing and in surrounding relation to said transducer section, and warmed coolant exit ports in the tubular wall of said housing adjacent the other end thereof.

7. A vibrator unit having a magnetostrictive transducer section designed to be longitudinally vibrated when energized by a surrounding high frequency alternating magnetic field, said transducer section being composed of a multiplicity of similar magnetostrictive laminates of uniform width, length and thickness and which are compactly stacked in internesting relationship; each of said similar laminates having a concavo-convex cross-section whose curvature is in the order of twenty to forty-five degrees and whereby compact internesting of adjacent stacked laminates can be achieved with substantially no gap between the adjacent surfaces of the stacked laminates, the dimensional thickness of each laminate being sufficiently thin to insure penetration of the magnetic flux, as generated by the surrounding high frequency alternating magnetic field, through a major part of the thickness of the laminates, said stacked concavo-convex laminates having a length which corresponds to one-half wavelength of sound or an integral multiple number thereof traveling longitudinally through the stacked laminates at the frequency of vibration induced by the surrounding alternating magnetic field; and a connecting body composed of vibration transmitting material having one end face thereof rigidly bonded to one of the respective adjacent ends of each of said stacked concavo-convex laminates.

8. A vibrator assembly including in combination; a vibrator unit having a transducer section composed of a multiplicity of similar and relatively thin magnetostrictive laminates of uniform width, length, thickness and concavo-convex curvature and which are compactly stacked in internesting relationship and operative to longitudinally vibrate at high frequency and small amplitude when energized by a high frequency alternating magnetic field, and a vibration transmitting acoustical impedance transformer whose input end is rigidly bonded to one end of the respective adjacent ends of said compactly stacked laminates and whose output end is provided with means for performing work; a housing having an axial hole at one end thereof through which the output portion of the acoustical impedance transformer is designed to externally project and through which the transducer section and the input portion of said transformer may be inserted into and withdrawn from said housing, and means associated with said housing and adapted to releasably engage said transformer at approximately a node of longitudinal vibration thereof and thereby removably support said vibrator unit in operative position; an energizing winding extending around but confined to the intermediate portion of said transducer section and operative when energized by high frequency alternating current to establish a concentrated and high frequency alternating magnetic field around the intermediate portion of said transducer section, and means for supporting said winding within said housing and independently of said vibrator unit.

9. A vibrator assembly including in combination; a vibrator unit having a transducer section designed to be longitudinally vibrated when energized by a surrounding high frequency alternating magnetic field, said transducer section being composed of a multiplicity of similar and relatively thin magnetostrictive laminates of uniform width, length, and thickness and which are compactly stacked in internesting relationship, each of said similar laminates having a concavo-convex cross-section whose curvature is not more than sixty degrees and whereby compact internesting of adjacent stacked laminates can be achieved with substantially no gap between the adjacent surfaces of the stacked laminates, said stacked concavo-convex laminates having a length which corresponds to one-half wavelength of sound or an integral multiple number thereof traveling longitudinally through the stacked laminates at the frequency of vibration induced by the surrounding alternating magnetic field, and a vibration transmitting acoustical impedance transformer whose input end is rigidly bonded to one end of the respective adjacent ends of said compactly stacked laminates and whose output end is provided with means for performing work; a housing having an axial hole at one end thereof through which the output portion of the acoustical impedance transformer is designed to externally project and through which the transducer section and the input portion of said transformer may be inserted into and withdrawn from said housing, and means associated with said housing and adapted to releasably engage said transformer at approximately a node of longitudinal vibration thereof and thereby removably support said vibrator unit in operative position; an energizing winding extending around said transducer section and operative when energized by high frequency alternating current to establish a concentrated and high frequency alternating magnetic field around the intermediate portion of said transducer section, and means for supporting said winding within said housing and independently of said vibrator unit.

10. A vibrator assembly including in combination; a vibrator unit having a transducer section designed to be longitudinally vibrated when energized by a surrounding high frequency alternating magnetic field, said transducer section being composed of a multiplicity of similar magnetostrictive laminates of uniform width, length and thickness and which are compactly stacked in internesting relationship, each of said similar laminates having a concavo-convex cross-section whose curvature is not more than sixty degrees and whereby compact internesting of adjacent stacked laminates can be achieved with substantially no gap between the adjacent surfaces of the stacked laminates, the dimensional thickness of each laminate being sufficiently thin to insure penetration of the magnetic flux as generated by the surrounding high frequency alternating magnetic field through a major part of the thickness of the laminates, said stacked concavo-convex laminates having a strength which corresponds to one-half wavelength of sound or an integral multiple number thereof traveling longitudinally through the stacked laminates at the frequency of vibration induced by the surrounding alternating magnetic field, and a vibration transmitting acoustical impedance transformer whose input end is rigidly bonded to one end of the respective adjacent ends of said compactly stacked laminates and whose output end is provided with means for performing work; a housing having an axial hole at one end thereof through which the output portion of the acoustical impedance transformer is designed to externally project and through which the transducer section and the input portion of said transformer may be inserted into and withdrawn from said housing, and means associated with said housing and adapted to releasably engage said transformer at approximately a node of longitudinal vibration thereof and thereby removably support said vibrator unit in operative position; an energizing winding extending around but confined to the intermediate portion of said transducer section and operative when energized by high frequency alternating current to establish a concentrated and high frequency alternating magnetic field around the intermediate portion of said transducer section, and means for supporting said winding within said housing and independently of said vibrator unit.

References Cited in the file of this patent

UNITED STATES PATENTS

| | | |
|---|---|---|
| 2,930,911 | Halliday | Mar. 29, 1960 |
| 2,947,890 | Harris | Aug. 2, 1960 |
| 2,951,975 | Carlin | Sept. 6, 1960 |
| 2,991,400 | Burgt | July 4, 1961 |